United States Patent
Malic et al.

(10) Patent No.: US 10,836,918 B2
(45) Date of Patent: Nov. 17, 2020

(54) MICROPARTICLES AND APPARATUS FOR SMART INK PRODUCTION

(71) Applicant: NATIONAL RESEARCH COUNCIL OF CANADA, Ottawa (CA)

(72) Inventors: Lidija Malic, Montreal (CA); Xuefeng Zhang, Boucherville (CA); Teodor Veres, Montreal (CA)

(73) Assignee: National Research Council of Canada, Ottawa (CA)

( * ) Notice: Subject to any disclaimer, the term of this patent is extended or adjusted under 35 U.S.C. 154(b) by 343 days.

(21) Appl. No.: 15/539,465

(22) PCT Filed: Dec. 23, 2015

(86) PCT No.: PCT/CA2015/051373
§ 371 (c)(1),
(2) Date: Jun. 23, 2017

(87) PCT Pub. No.: WO2016/101079
PCT Pub. Date: Jun. 30, 2016

(65) Prior Publication Data
US 2017/0362449 A1 Dec. 21, 2017

Related U.S. Application Data

(60) Provisional application No. 62/096,689, filed on Dec. 24, 2014.

(51) Int. Cl.
*C09D 11/03* (2014.01)
*B41M 3/14* (2006.01)
(Continued)

(52) U.S. Cl.
CPC ............. *C09D 11/03* (2013.01); *B01J 13/16* (2013.01); *B41M 3/14* (2013.01); *C09D 11/037* (2013.01);
(Continued)

(58) Field of Classification Search
None
See application file for complete search history.

(56) References Cited

U.S. PATENT DOCUMENTS

| | | |
|---|---|---|
| 4,143,103 A | 3/1979 | Sheridon |
| 4,315,720 A | 2/1982 | Ueda et al. |

(Continued)

FOREIGN PATENT DOCUMENTS

| | | |
|---|---|---|
| CA | 2563836 C | 6/2011 |
| WO | WO2005/103106 A1 | 11/2005 |

(Continued)

OTHER PUBLICATIONS

Tang, Jennifer L. et al—"Bifunctional Janus Microparticles with Spatially Segregated Proteins"; ACS Publications; Langmuir, 2012, 28 (26), pp. 10032-10039.

(Continued)

*Primary Examiner* — Jeffrey D Washville
(74) *Attorney, Agent, or Firm* — Aventum IP Law LLP (57) ABSTRACT

A smart ink, comprising microparticles, with each microparticle comprising: a) an exterior shell; b) a liquid encapsulated within the shell; and c) a Janus microparticle suspended in the liquid, wherein the Janus microparticle either comprises: i) two or more distinct assemblies of particles; or ii) a core loaded with particles, the core having a first surface portion and a second surface portion that is functionally distinct from the first surface portion. An apparatus and method for production of the microparticles are also provided.

20 Claims, 10 Drawing Sheets

(51) Int. Cl.

| | |
|---|---|
| *C09D 11/10* | (2014.01) |
| *B01J 13/16* | (2006.01) |
| *B82Y 20/00* | (2011.01) |
| *C09D 11/037* | (2014.01) |
| *C09D 11/50* | (2014.01) |
| *B82Y 30/00* | (2011.01) |
| *B82Y 15/00* | (2011.01) |
| *B82Y 25/00* | (2011.01) |

(52) U.S. Cl.
CPC .............. *C09D 11/10* (2013.01); *C09D 11/50* (2013.01); *B82Y 15/00* (2013.01); *B82Y 20/00* (2013.01); *B82Y 25/00* (2013.01); *B82Y 30/00* (2013.01); *Y10S 977/773* (2013.01); *Y10S 977/81* (2013.01); *Y10S 977/811* (2013.01); *Y10S 977/892* (2013.01); *Y10S 977/95* (2013.01)

(56) References Cited

U.S. PATENT DOCUMENTS

| | | | |
|---|---|---|---|
| 4,438,160 | A | 3/1984 | Ishikawa et al. |
| 4,810,431 | A | 3/1989 | Leidner |
| 5,262,098 | A | 11/1993 | Crowley et al. |
| 5,344,594 | A | 9/1994 | Sheridon |
| 5,717,514 | A | 2/1998 | Sheridon |
| 5,754,332 | A | 5/1998 | Crowley |
| 5,891,479 | A | 4/1999 | Sheridon |
| 5,914,805 | A | 6/1999 | Crowley |
| 7,875,654 | B2 | 1/2011 | Hong et al. |
| 8,049,954 | B2 | 11/2011 | Lipovetskaya et al. |
| 8,068,271 | B2 | 11/2011 | Lipovetskaya et al. |
| 8,501,272 | B2 | 8/2013 | Lipovetskaya et al. |
| 8,696,952 | B2 | 4/2014 | Kumacheva et al. |
| 2008/0213593 | A1 | 9/2008 | Bala Subramaniam et al. |
| 2011/0129941 | A1* | 6/2011 | Kumacheva ......... A61K 9/1694 436/180 |
| 2014/0220350 | A1 | 8/2014 | Kim et al. |

FOREIGN PATENT DOCUMENTS

| | | |
|---|---|---|
| WO | 2009048532 A2 | 4/2009 |
| WO | WO2009/061372 A1 | 5/2009 |
| WO | WO2011/028764 A2 | 3/2011 |
| WO | 2014130761 A2 | 8/2014 |

OTHER PUBLICATIONS

Lu, Annie Xi et al—"Continuous Microfluidic Assembly of Anisotropic Microparticle Dimers"; 17th International Conference on Miniaturized Systems for Chemistry and Life Sciences; (2013) pp. 1370-13.
Hasinovic, Hida et al—"Destabilization mechanisms in a triple emulsion with Janus drops"; www.sciencedirect.com;science/article/pi/S00219797110076497.
Dyab, Amro K. F. et al—"Fabrication of novel anisotropic magnetic microparticles"; Journal of Materials Chemistry; issue 1, 2013; DOI 10.1039/B814971M: Received Aug. 27, 2008, Accepted Mar. 13, 2009.
Chen, Chia-Hung et al—"Janus Particles Templated from Double Emulsion Droplets Generated Using Microfluidics"; ACS Pulications; Langmuir—2009, 25 (8), pp. 4320-4323.
"Microfluidic synthesis of anisotropic particles from Janus drop by in situ photopolymerization"; Spring Link—Biomedical Engineering Letters; Jun. 2012, vol. 2, Issue 2, pp. 95-99.
Yang, S. et al—"Microfluidic synthesis of multifunctional Janus particles for biomedical applications"; RSC Publishing—Lab chip—Jun. 21, 2012;12 (12) 2097-102. DOI:10.1039/c21c90046g.
Zhao, Chun-Xia—"Multiphase flow microfluidics for the production of single or multiple emulsions for drug delivery"; Advanced Drug Delivery Reviews—2013—pp. 1420-1426.
Kim, Shin-Hyun—"Multiphasic microfluidics for functional soft materials"; Department of Chemical and Biomolecular Engineering, KAIST.
Hasinovic, Hida et al—"One-Step Inversion Process to a Janus Emulsion with Two Mutually Insoluble Oils"; ACS Publications—Langmuir 2011, 27—pp. 6584-6588.
Nissisako et al—"Polymer microparticles: Drop by drop"—www.titech.ac/jp/english/news/2011/025650/html.
Nissisako et al—"Synthesis of Shape-Controlled Polymer Microparticles Using Asymmetric Microfluidic Channels" Precision and Intelligence Laboratory; Tokyo Institute of Technology, R2-6.
Dendukuri, Dhananjay et al—"The Synthesis and Assembly of Polymeric Microparticles Using Microfluidics"—Advanced Materials; 2009, 21, pp. 1-16.
Deng, Nan-Nan et al—"Wetting-induced formation of controllable monoidsperse multiple emulsions in microfluidics3": RSC Publishing, 2013—pp. 4047-4052.
Hu, Jing et al—"Fabrication, properties and applications of Janus particles"; Chem Soc Rev, 2012, 41, pp. 4356-4378.
Kim, Shin-Hyun et al—"Optofluidic Sythesis of Electroresponsive Photonic Janus Bass with Isotropic Structural Colors"—Advance Materials; 2008—pp. 4129-4234.
Nie, Zhihong et al—"Janus and Ternary Particles Generated by Microfludic Synthesis: Design, Synthesis, and Self-Assembly"—JACS Articles; 2006—pp. 9408-9414.
Nisisako, T. et al—"Synthesis of Monodisperse Bicolored Janus Particles with Electrical Anisotropy Using a Microfluidic Co-Flow Syste"—Advanced Materials; 2006—pp. 1152-1156.
Walther, Andreas et al—"Janus Particles: Synthesis, Self-Assembly, Physical Properties, and Applications"—ACS Publications; Chemical Reviews; 2013—pp. 5194-5261.
Abate A.-R. et al. Microfluidic Techniques for Synthesizing Particles. 1-21.
Choi C.-H. et al. (2013) One Step Formation of Controllable Complex Emulsions: From Functional Particles to Simultaneous Encapsulation of Hydrophilic and Hydrophobic Agents into Desired Position. Adv. Mater. DOI: 10.1002/ adma.201204657.
Choi C.-H. et al. (2014) Microfluidic Design of Complex Emulsions. ChemPhysChem. 15, 21-29.
Kim J.-W. et al. (2008) Colloid Surfactants for Emulsion Stabilization. Adv. Mater. 20, 3239-3243.
Komazaki Y. et al. (2015) Electrically and Magnetically Dual-Driven Janus Particles for Handwriting-Enabled Electronic Paper. Journal of Applied Physics. 117, 154506. 7 pages.
Panizza P. et al. (2008) Controlled Production of Hierarchically Organized Large Emulsions and Particles Using Assemblies on Line of Co-Axial Flow Devices. Colloids and Surfaces A: Physicochem. Eng. Aspects. 312, 24-31.
Pannacci N. et al. (2008) Equilibrium and Nonequilibrium States in Microfluidic Double Emulsions. Physical Review Letters. PRL 101, 164502. 4 pages.
Park B.-J. et al. (2012) Configuration of Nonspherical Amphiphilic Particles at a Fluid-Fluid Interface. Soft Matter. 8, 7690-7698.
Pirmoradi F.-N. et al. (2013) Microcapsules with Magnetic Nanoparticle-Based Shell and Aqueous Core Via Selective Polymerization for Therapeutic Delivery Applications. 17th International Conference on Miniaturized Systems for Chemistry and Life Sciences. 27-31.
Shepherd R.-F. et al. (2006) Microfluidic Assembly of Homogenous and Janus Colloid-Filled Hydrogel Granules. 22, 8618-8622.
Yuet K.-P. et al. (2009) Multifunctional Superparamagnetic Janus Particles. Langmuir Article. Langmuir 2010.26(6), 4281-4287.

\* cited by examiner

MICROPARTICLES AND APPARATUS FOR SMART INK PRODUCTION

The present disclosure relates to microparticles. In particular, it relates to a smart ink comprising microparticles that provide covert security features, along with apparatus and methods to produce such microparticles.

Digital printing technology represents a counterfeiting threat as digital reproduction methods are increasingly being used to produce holographic and printed features similar to those on banknotes and other security documents. With the advancement in digital printing, the quality of printed features could become indistinguishable from gravure printing, intaglio printing, offset printing and holograms. While optically active devices and inks have proven useful in slowing counterfeiters, security document and feature designers need more tools to stay ahead of counterfeiters.

Particles are frequently used to impart security features to high-value items. These security features are typically derived from the chemical composition of the particles and include luminescent materials, magnetic, optically variable pigments, thermo-chromic materials, and the like. Since most of these particles are produced by traditional processes, the counterfeit deterrence is limited.

The development of efficient methods for fabricating and actuating multifunctional asymmetric microparticles plays an important role in the advancement of the next generation of functional materials. These materials can serve as "intelligent" building blocks of smart inks, compartmentalized drug carriers, optical, electronic, and sensor devices. For instance, anisotropic microparticles possessing two sides of distinct composition, commonly called Janus particles, have shown potential as emulsions stabilizers, in inks for electronic paper, or in solar cell compositions.

In the case of electronic inks, Janus particles with oppositely-charged hemispheres have a large dipole moment that allows for their remote positioning in an electric field. The particles are typically then suspended in a carrier gel or oil, sandwiched between two substrates that enclose the floating particles. The function of the enclosure is twofold: it contains electrodes required for particle actuation; and it prevents evaporation of carrier oil surrounding the particle. Examples of patent documents that disclose Janus particles, their production, incorporation in displays and applications include U.S. Pat. Nos. 8,501,272; 8,068,271; 8,049,954; 5,914,805; 5,891,479; 5,754,332; 5,717,514; 5,344,594; 5,262,098; 4,810,431; 4,438,160; 4,315,720; and 4,143,103, all of which are incorporated herein by reference.

The advancement in the development of electrically anisotropic Janus particles and enclosure devices has fueled numerous applications in the display technology field, and these particles have been commercialized. However, the requirement for the specialized enclosure substrates for their actuation has prevented their use as printing inks that can be deposited directly on the printed substrate.

Currently available Janus particle production processes are limited to production of simple Janus particles which then require specialized enclosure devices to enable their actuation. The following documents disclose examples of such processes:
1) Andreas Walther and Axel H. E. Müller, *Chemical Reviews* 2013 113 (7), 5194;
2) Nie, Z.; Li, W.; Seo, M.; Xu, S.; Kumacheva, E. *J. Am. Chem. Soc.* 2006, 128, 9408;
3) Kim, S.-H.; Jeon, S.-J.; Jeong, W. C.; Park, H. S.; Yang, S.-M. *Adv. Mater.* 2008, 20, 4129; and
4) T. Nisisako, T. Torii, T. Takahashi, Y. Takizawa, *Adv. Mater.* 2006, 18, 1152.

The requirement for specialized enclosure devices prevents direct use of Janus particles in multifunctional smart inks that can be printed directly on any substrate and subsequently actuated to generate security features.

There is a need for a new and difficult-to-reproduce fabrication method that can generate microparticles with multifunctional features, without the limitation of specialized enclosure devices.

The microparticle, the apparatus and method used in the production thereof, in their general forms will first be described, and then there implementation in terms of embodiments will be detailed hereafter. These embodiments are intended to demonstrate the principles of the microparticle, the apparatus and method used in the production thereof, and the manner of implementation. The microparticle, the apparatus and method used in the production thereof, in the broadest and more specific forms will then be further described, and defined, in each of the individual claims which conclude this specification.

In one aspect of the present invention, there is provided a microparticle comprising: a) an exterior shell; b) a liquid encapsulated in the shell; and c) a Janus microparticle suspended in the liquid, wherein the Janus microparticle either comprises: i) two or more distinct assemblies of particles; or ii) a core loaded with particles, the core having a first surface portion and a second surface portion that is functionally distinct from the first surface portion.

In a further aspect of the present invention, there is provided a microparticle ink comprising the microparticles.

In another aspect of the present invention, there is provided a method of fabricating the microparticle using a flow-focusing microfluidic system, comprising the steps of: dispersing the Janus microparticle into the liquid in a first microfluidic channel of the microfluidic system to form a dispersion; injecting the dispersion into a first junction intercepted by two monomer microfluidic channels, each monomer microfluidic channel carrying a continuous phase of a monomer towards the first junction, thereby forming a double emulsion composed of droplets surrounded by the continuous phase of the monomer, each droplet comprising the Janus microparticle encapsulated by the liquid; flowing the double emulsion through a second junction intercepted by two liquid microfluidic channels, each liquid microfluidic channel carrying a continuous phase of a second liquid, the second liquid immiscible with the liquid, thereby forming a triple emulsion composed of the Janus particle immersed in the liquid encapsulated by the monomer surround by a continuous phase of the second liquid; and applying a UV source to the triple emulsion thereby polymerizing the monomer to form the external shell.

In yet a further aspect of the present invention there is provided a microparticle ink made by the above method.

In yet a further aspect of the present invention, there is provided a microfluidic device for fabrication of the microparticle comprising: a first microfluidic channel that simultaneously intersects a second and third microfluidic channel at a first flow-focus junction leading to a fourth microfluidic channel; and the fourth microfluidic channel simultaneously intersects a fifth and sixth microfluidic channel at a second flow-focus junction leading to a seventh microfluidic channel.

The Janus particle may comprise two distinct assemblies of particles; with each assembly of particles embedded in a polymer; and the particles are selected from the group consisting of dyes, pigments and functional nanoparticles.

The particles may comprise matter that is transparent, opaque, dyed, reflective, fluorescent, plasmonic, magnetic or electrically-charged. In one example of the above, the first assembly comprises a polymerized first monomer loaded with fluorescent silica nanoparticles and the second assembly comprises a polymerized second monomer loaded with plasmonic magnetic nanoparticles, where the second monomer is miscible with the first monomer.

In another example, the first assembly comprises a polymerized first monomer loaded with fluorescent silica nanoparticles and the second assembly comprises a polymerized second monomer loaded with plasmonic magnetic nanoparticles, where the second monomer is immiscible with the first monomer.

In either example, the plasmonic magnetic nanoparticles can be gold-silica coated iron oxide nanoparticles.

Alternatively, the Janus particle may comprise a core, wherein the core is either a homogenous polymer or inorganic, and the core is loaded with particles selected from the group consisting of dyes, pigments and functional nanoparticles. The first and/or second surface portions can be coated with either: a) a thin film; or b) a monolayer of nanoparticles that is subsequently covered with a thin optical film. In either case, the thin film or the nanoparticles may be magnetic. Furthermore, the first surface portion may be covered with a thin film of electroless-deposited metal, which may be nickel.

The exterior shell of the microparticle may comprise an exterior polymeric or inorganic shell. For example, the exterior shell may comprise silica.

The liquid of the microparticle can be selected from an aqueous solution, oil, lubricant, ionic liquid and a resin. Such a liquid may have low volatility, for example, a volatility of less than 23 torr at room temperature. The Janus microparticle itself may have a size of from 1 nm to 1000 microns, which orients in response to an applied external field.

With regards to the method of fabricating the microparticle described above, one manner in which the Janus microparticle can be formed is by prior to step (a), injecting a first monomer composition into a first inlet; injecting a second monomer composition different from the first monomer composition into a second inlet and co-flowing the first and second inlets to a prejunction that is intercepted by two channels, each channel carrying the liquid, thereby forming uncured Janus microparticles composed of the first and second monomer compositions dispersed in a continuous phase of the liquid; and polymerizing the first and second monomer compositions in step (d). The first monomer composition may comprise nanoparticles, dyes, pigments or any combination thereof; and the second monomer composition may comprise nanoparticles, dyes, pigments or any combination thereof. In one example, the first monomer composition comprises magnetic gold nanoparticles and the second monomer composition comprises fluorescent nanoparticles.

With regards to the method of fabricating the microparticle described above, another manner in which the Janus microparticle can be formed is prior to step (a) by: loading the core with particles that may be selected from the group consisting of nanoparticles, dyes, colorants and any combination thereof; and depositing a thin film on the first surface portion. The thin film can be an electroless deposited metal, for example, nickel.

With regards to the method of fabricating the microparticle described above, a third manner in which the Janus microparticle can be formed is prior to step (a) by: dispensing a nanoparticle suspension onto the first surface portion of the core; evaporating solvent from the dispensed nanoparticles suspension thereby forming a monolayer of nanoparticles on the first surface portion; and depositing a color-absorbing thin film onto the monolayer of nanoparticles. The nanoparticles suspension may be magnetic.

When fabricating the microparticles using the method described above, the liquid may be a non-volatile liquid selected from an aqueous solution, oil, an ionic liquid and resin. In one example, the liquid is an ionic liquid or an aqueous solution, while the second liquid is oil. In another example, the liquid is an oil while the second liquid is an ionic liquid or an aqueous solution.

With regards to the microfluidic device, the first flow-focus junction can have a height and width that is less than a height and width of the fourth microfluidic channel; while the second flow-focus junction can have a height and width that is less than a height and width of the seventh microfluidic channel. In general, each flow-focus junction can have an aspect ratio of between 0.5 and 2.

The microfluidic device may further comprise a UV source applied after the seventh microfluidic channel. In addition, a dispersion of the Janus microparticle in the liquid can flow in the first microfluidic channel; a continuous phase of a monomer can flow in the second and third microfluidic channels; a double emulsion of droplets can flow in the fourth microfluidic channel; a second liquid immiscible with the liquid can flow in the fifth and sixth microfluidic channels; and a triple emulsion can flow in the seventh microfluidic channel, wherein the double emulsion comprises droplets of the Janus microparticle in the liquid surrounded by the continuous phase of the monomer; and the triple emulsion comprises the Janus particle immersed in the liquid encapsulated by the monomer surround by a continuous phase of the second liquid.

In general, the microfluidic device may further comprise a prejunction prior to the first microfluidic channel, with the prejunction consisting of the intersection of a plurality of additional microfluidic channels. In this arrangement, a first monomer composition flows in a first additional microfluidic channel, a second monomer composition different from the first monomer composition flows in a second additional microfluidic channel; the liquid flows in a third and fourth additional microfluidic channels; a dispersion of the Janus microparticle comprising the first and second monomer compositions dispersed in the liquid flows in the first microfluidic channel; a continuous phase of a third monomer flows in the second and third microfluidic channels; a double emulsion of droplets flows in the fourth microfluidic channel; a second liquid immiscible with the liquid flows in the fifth and sixth microfluidic channel; and a triple emulsion flows in the seventh microfluidic channel, wherein the double emulsion comprises droplets of the Janus microparticle in the liquid surrounded by a continuous phase of the third monomer; and the triple emulsion comprises the Janus particle immersed in the liquid encapsulated by the third monomer surround by a continuous phase of the second liquid.

In general, the plurality of channels and flow-focused junctions of the microfluidic device can be made from material selected from the group consisting of silicon, glass, polydimethylsiloxane, a then ioplastic polymer, a thermoplastic elastomer and any combinations thereof. The thermoplastic polymer can be selected, for example, from cyclic olefin copolymer, polymethyl methacrylate, polycarbonate, polyurethane, polyimide and polystyrene.

In general, the microfluidic channels, the additional microfluidic channels, the and flow-focused junctions of the microfluidic device can be made using a method selected from the group consisting of photolithography, wet etching, dry etching, soft-lithography, hot-embossing, nano-imprinting and injection-molding.

Wherever ranges of values are referenced within this specification, sub-ranges therein are intended to be included within the scope of the microparticle, the apparatus and method used in the production thereof, unless otherwise indicated. Where characteristics are attributed to one or another variant of the microparticle, the apparatus and method used in the production thereof, unless otherwise indicated, such characteristics are intended to apply to all other variants where such characteristics are appropriate or compatible with such other variants.

DETAILED DESCRIPTION OF PREFERRED EMBODIMENTS

First Embodiment

Figure 1:
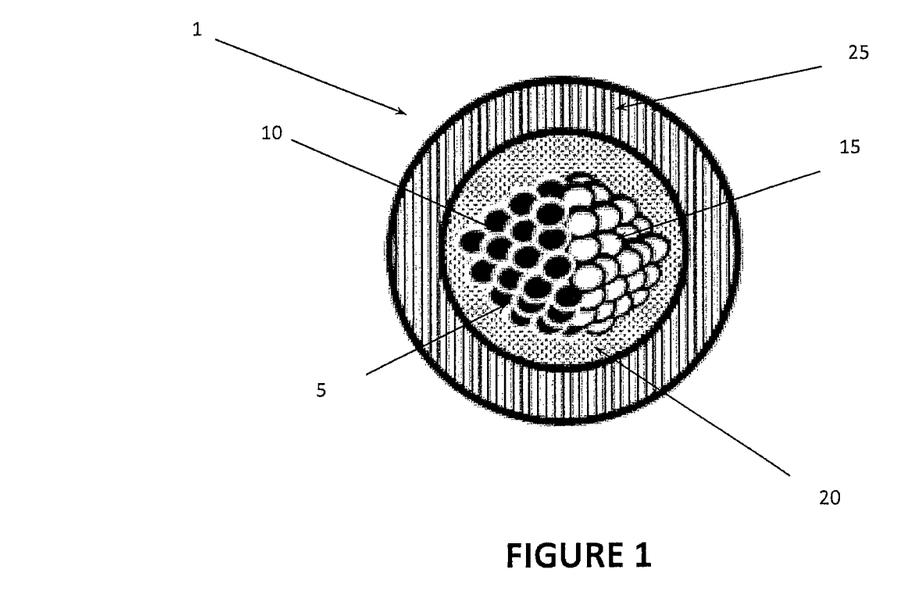
FIG. 1 illustrates an embodiment of the microparticle.

FIG. 1 illustrates an embodiment of the microparticle (1). The microparticle comprises a Janus microparticle (5) suspended in a non-evaporating liquid (20) that is encapsulated by a hard polymer shell (25).

The Janus microparticle (5) comprises two portions (10, 15) that are chemically or structurally distinct. Each portion (10, 15) may be hemispherical, thereby leading to an overall spherical shape of the Janus microparticle (5). Alternatively, each portion (10, 15) can be partly spherical, thereby giving the Janus microparticle (5) the semblance of a dumbbell shape. Other shapes and configurations are possible, giving rise to (asymmetric) Janus microparticles that can be used in the microparticle (1).

In the embodiment shown in FIG. 1, each distinct portion (10, 15) comprises a polymerized assembly of particles. As an example, these particles can be selected from pigments, dyes, nanoparticles and any combination thereof. In addition, the particles can be transparent, reflective, fluorescent, plasmonic, magnetic or electrically charged.

As an example, the first portion (10) of the Janus particle (5) can consist of fluorescent silica nanoparticles embedded in a polymer, while the second portion (15) can consist of magnetic and plasmonic gold-coated silica-iron-oxide nanoparticles. As further sub-examples, the first portion (10) of can consist of polymerized Polyethylene (glycol) Diacrylate (PEG-DA) loaded with fluorescent silica nanoparticles, while the second portion (15) can consist of polymerized PEG-DA loaded with the plasmonic magnetic nanoparticles. Alternatively, the first portion (10) of can consist of polymerized ethoxylated trimethylolpropane triacrylate (EPTPA) loaded with fluorescent silica nanoparticles, while the second portion (15) can consist of polymerized PEG-DA loaded with the plasmonic magnetic nanoparticles. The fluorescent portion of the Janus microparticle (5) can be visible to the naked eye. This visual feature is enhanced when there are a multitude of such Janus microparticles (5).

The non-evaporating liquid (20) can be an aqueous solution, ionic liquid, oil, lubricant or a resin. The liquid can also contain surfactants and/or dispersion agents known in the art that favor particle dispersion and emulsion stabilization. In an example, the liquid and the surfactant of the microparticle can be selected from the perfluorinated polyether (PFPE) fluid family.

The polymer shell (25) can be made of monomers that allow for dispersion of the microparticle (1) in aqueous solutions or solvents such that the microparticle (1) can be directly printed on a substrate of choice.

The overall size of microparticle (5) ranges from 1 nm to 1000 μm.

Figure 2A:
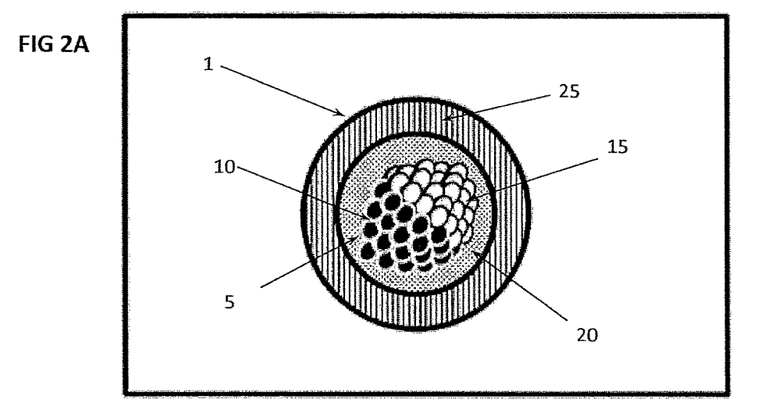
FIGS. 2A to 2C illustrate the microparticle of FIG. 1 in response to an external field.
Figure 2B:
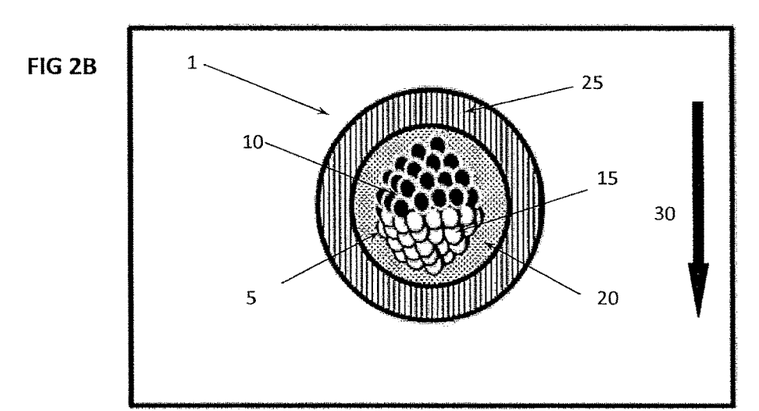
Figure 2C:
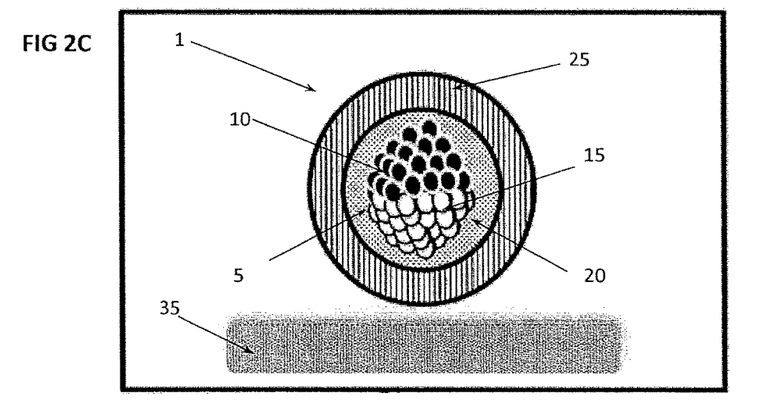

FIGS. 2A-2C illustrate the response of the microparticle in FIG. 1 to an external field. Without an applied external field, as shown in FIG. 2A, the encapsulated Janus microparticle (5) is randomly oriented within the liquid (20) encapsulated by the shell (25). However, in the presence of an external field (30) that acts on portion (10) and/or portion (15), as shown in FIG. 2B, the suspended Janus microparticle (5) can be oriented within the liquid (20) in the direction of the applied external field. The external field can be magnetic, electric, optical or gravitational. FIG. 2C provides an example in which the external field is a magnetic field provided by an external magnet (35), and portion (15) comprises magnetic and plasmonic gold-coated silica-iron-oxide nanoparticles. The magnetic particles within portion (15) cause the Janus microparticle (5) to orient within the liquid (20) in the direction as shown. Such an embodiment can be used to make covert security features.

Figure 3A:
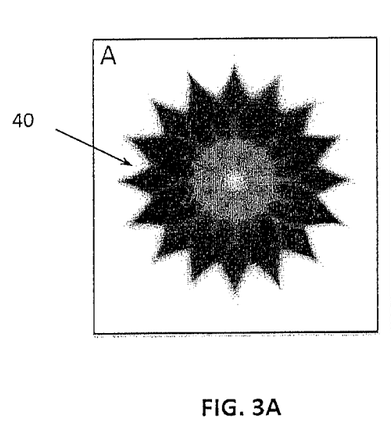
FIGS. 3A to 3C illustrate an example of an optical effect obtained by smart ink printing on a substrate.
Figure 3B:
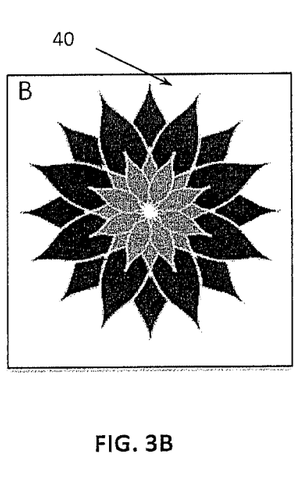
Figure 3C:
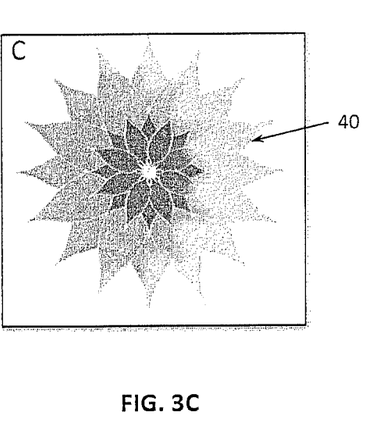

FIGS. 3A to 3C illustrate an example of an optical effect obtained by smart ink printing on a substrate. The smart ink comprises microparticles in which the first portion comprises an assembly of silica nanoparticles with florescence dye doping, while the second portion comprises an assembly of gold-coated-silica-shell-iron-oxide nanoparticles.

In FIG. 3A, by applying a magnetic field during printing, microparticles are oriented on the surface of the substrate, and by subsequent selective UV exposure through a mask pattern or by laser writing, the aligned microparticles are permanently set in a polymerized middle liquid. The gold-coated nanoparticles in the Janus microparticle provide image color of a design (40) (red flower colors; in FIG. 3A, this is shown as a dark shaded portion of the design (40)). The non-exposed area of the printed image contains randomly oriented microparticles, thus providing a blurring effect of the (flower) design (40). Once printed, covert features are seen when applying a second magnetic field, revealing bright yellow features of the design (40) (shown as the sharp light-coloured outlines of the flower petals in FIG. 3B), which provide a sharpened image.

Finally, as an additional covert security feature, under UV light, the particles fluoresce and/or provide a specific plasmonic signature as illustrated in FIG. 3C, where the design (40) changes in colour from the original red hue (or dark features in FIG. 3B) to a fluorescent yellow (light features shown in FIG. 3C).

Figure 4A:
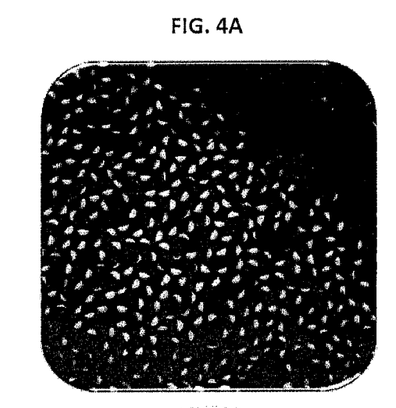
FIGS. 4A to 4D illustrate examples of a microparticle assembly with sharp and blurring fluorescence effects without and with the application of a magnetic field.
Figure 4B:
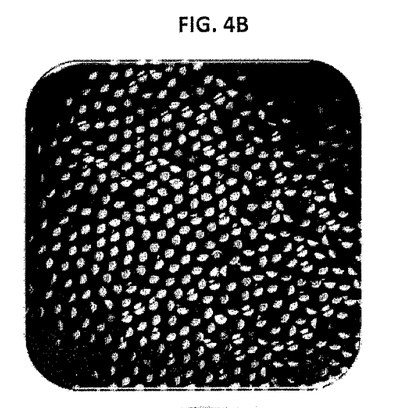
Figure 4C:
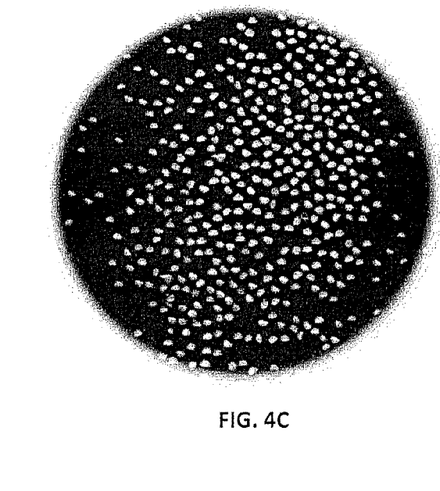
Figure 4D:
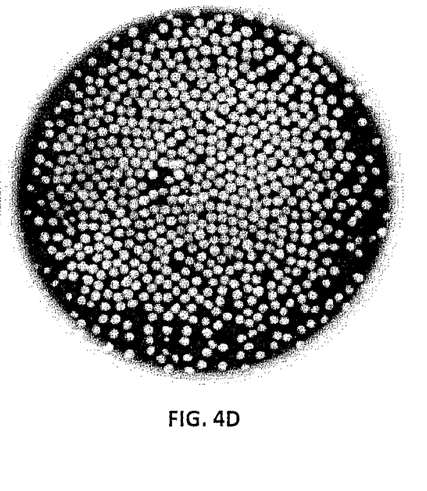

An example of microparticle assembly with sharp and blurring fluorescence effects without and with the application of a magnetic field are shown in FIGS. 4A to 4D. FIGS. 4A and 4C are sample images of faint (or blurred) fluorescence without an external magnetic field, where the Janus microparticles are randomly oriented, and thus the fluorescence effects are dampened due to destructive interference. FIGS. 4B and 4D are sample images of intense (or sharpened) fluorescence in the presence of an external magnetic field. Here, the Janus microparticles are no longer randomly oriented, but rather, aligned with the external magnetic field due to magnetic nanoparticles in the Janus microparticle. The fluorescence effect is thus more intense, as the fluorescent portions of the Janus microparticles are aligned, rather than randomly oriented.

Second Embodiment

Figure 5:
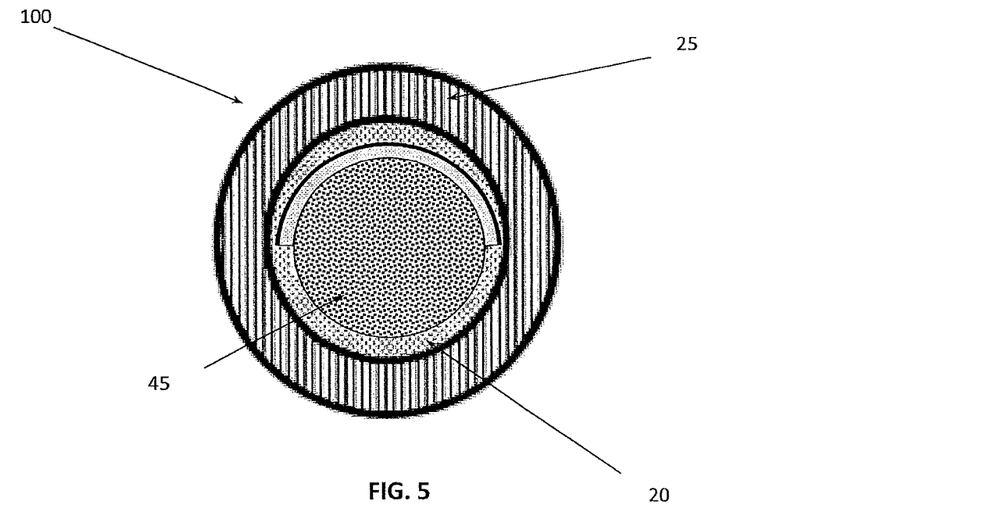
FIG. 5 illustrates another embodiment of the microparticle.
Figure 6:
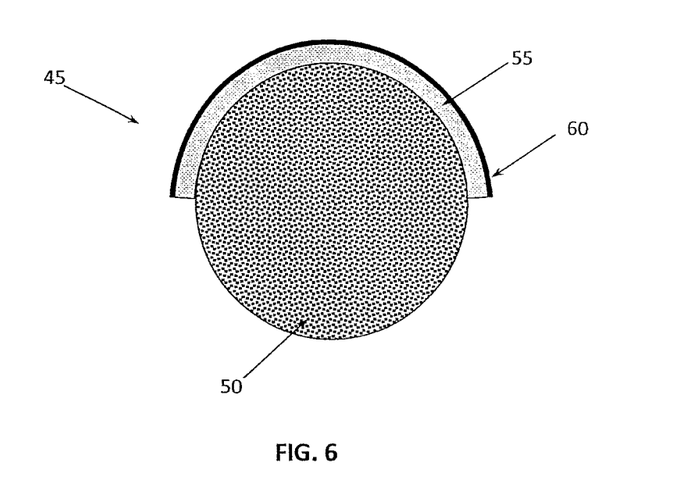
FIG. 6 illustrates a Janus particle used in the embodiment of FIG. 5.

FIG. 5 illustrates another embodiment of the microparticle (100), while FIG. 6 illustrates a Janus particle (45) used in the embodiment of FIG. 5.

As in the first embodiment shown in FIG. 1, microparticle (100) comprises a Janus microparticle (45) suspended in a non-evaporating liquid (20) that is encapsulated by a hard polymer shell (25). The Janus microparticle (45), shown in greater detail in FIG. 6, can consist of a homogeneous polymer core (50) that can be loaded with functional nanoparticles (silica, fluorescent, plasmonic or composite thereof), dyes or colorants. While a spherical core is shown in FIG. 6, it is understood that the polymer core (50) may take other suitable shapes. The surface of one hemisphere of the polymer core (50) is coated with a layer of material acting as a hemispherical shell (55) in order to impart a separate functionality. This can be achieved using, for example, deposited thin magnetic films or assembly of a monolayer of magnetic nanoparticles deposited using solvent evaporation and self-assembly. This hemisphere can be subsequently covered with an optically absorbing thin film (60) to provide color contrast from the uncoated hemisphere.

In particular, one advantage of Janus microparticles (45) having a hemisphere coated with electroless-deposited Nickel or an assembly of nanoparticles covered by thin absorbing films (60), is the retention of a low remnant magnetic moment in the Nickel layer which enables switchability of visual optical effect by applying and removing the magnetic field without any chain fonnation or agglomeration.

As examples of this embodiment, the polymer core (50) of the microparticle can be composed of a polymer loaded with fluorescent dye, nanoparticles or colorant or any combination thereof. An example of suitable polymers includes PEGDA, ETPTA, polystyrene, PMMA and other polymers known in the art. The assembly of nanoparticles (55) can consist, for example, of superparamagnetic nanoparticles such as iron-oxide nanoparticles or silica-coated iron-oxide nanoparticles. The absorbing thin film (60) can be a combination of dielectric and metallic thin films such as gold, chromium, nickel, titanium, silicon dioxide and silicon nitride. In an embodiment, the absorbing thin film (60) can consist of sequential layers of: chromium, gold, nickel, chromium, silicon dioxide, chromium and silicon dioxide.

Figure 7A:
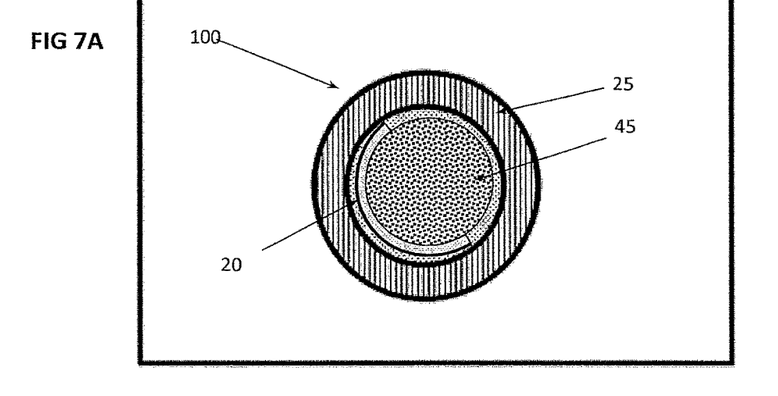
FIGS. 7A to 7C illustrate the response of the microparticle in FIG. 5 to an external field.
Figure 7B:
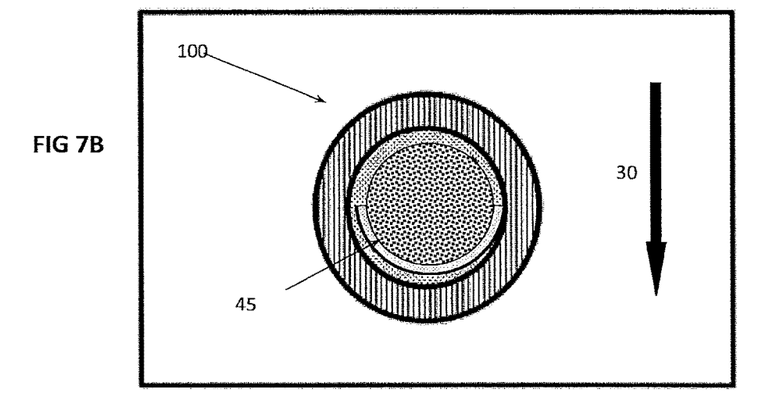
Figure 7C:
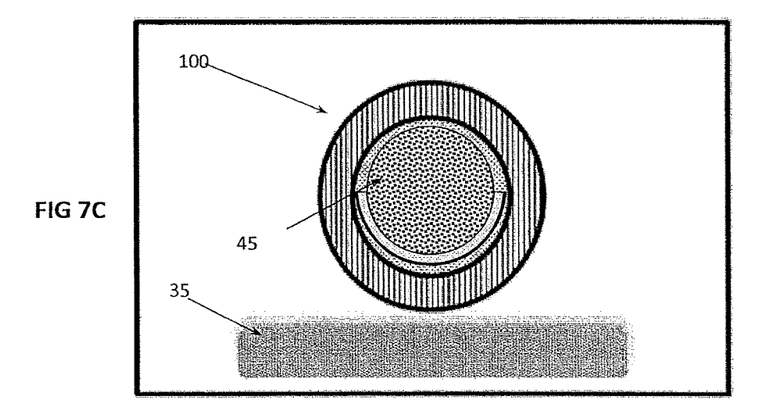

FIGS. 7A to 7C illustrate the response of a microparticle (100) shown in FIG. 5 to an external field. Without an applied external field, as shown in FIG. 7A, the encapsulated Janus microparticle (45) is randomly oriented within the liquid (20) encapsulated by the shell (25). However, as illustrated in FIG. 7B, in the presence of an external field (30), the suspended Janus microparticle (45) can be oriented within the liquid (20) in the direction of the applied external field. The external field (30) can be magnetic, electric, optical or gravitational. FIG. 7C provides an example in which the external field is a magnetic field provided by an external magnet (35).

As with the first embodiment, an ink comprises a plurality of these microparticles (100), which is printed on a surface of a substrate. Without the presence of an external field, the encapsulated Janus microparticles are randomly oriented within the liquid encapsulated by the shell. As such, the collective optical effect of the printed microparticles is random. However, by applying an external field (for example, a permanent magnet), the suspended Janus microparticles can be oriented within the liquid in the direction of the applied field thus exhibiting the desired optical effect.

Figures 8A, 8B:
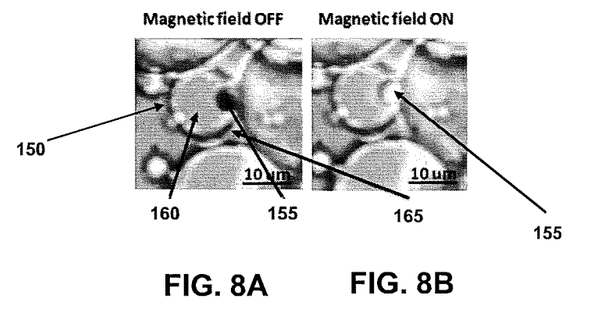
FIGS. 8A and 8B illustrates the effect of a magnetic field on microparticles of the second embodiment.

As an example, the magnetic manipulation of microparticles, each with an encapsulated Janus microparticle exhibiting one hemisphere that is fluorescent and a second hemisphere that is magnetic is demonstrated in FIG. 8 FIGS. 8A-B. The microparticle (150) comprises a polymer shell (165), fluid (160) and the Janus microparticle (155). The fluid (160) is a liquid monomer. The Janus microparticle core is composed of PEGDA loaded with a fluorescent dye. One hemisphere of the microparticle is covered by magnetic and absorbing thin film consisting of Ni (30 nm)—Au (80 nm)—Cr (2 nm)—$SiO_2$ (80 nm)—Cr (10 nm)—$SiO_2$ (80 nm). The particle is suspended in PFPE fluid (Galden HT 200 liquid) containing PFPE surfactant (Krytox). The shell consists of photopolymerized ETPTA. In FIG. 8A, there is an absence of an applied magnetic field, whereas in FIG. 8B, a magnetic field is turned on. In FIG. 8B, the Janus microparticle (50) orients in alignment with the applied magnetic field. This is seen by the light color of the aligned Janus microparticle (50) in FIG. 8B, compared to the dark color of the non-aligned Janus microparticle (50) in FIG. 8A.

Method of Manufacture

Figure 9:
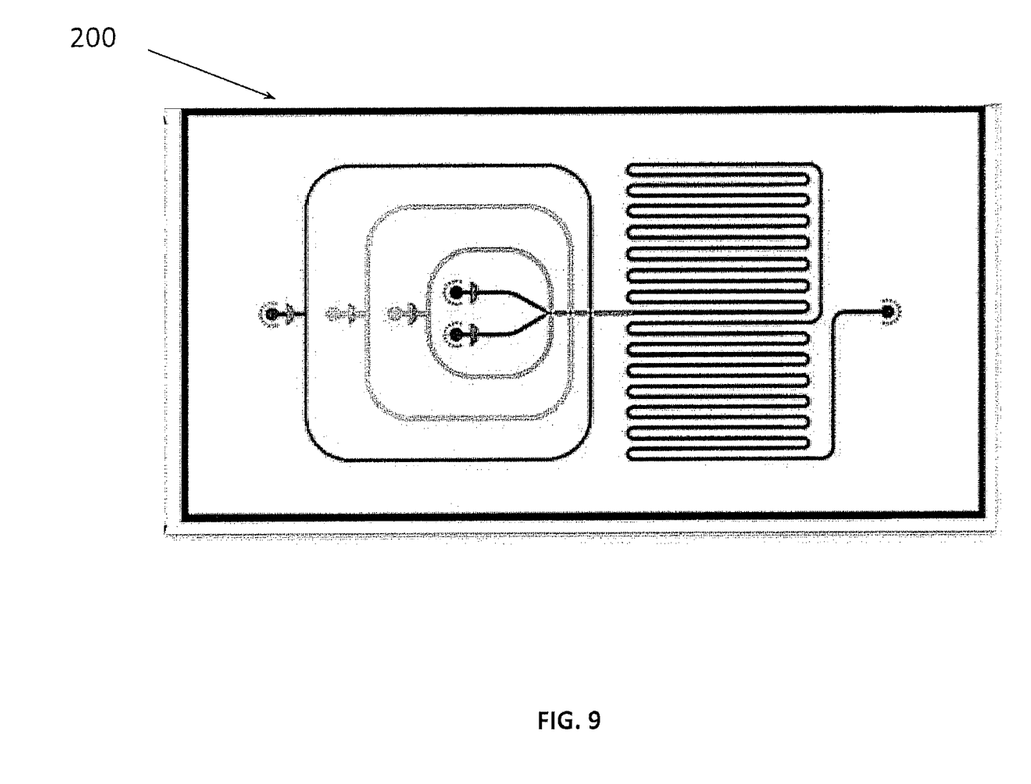
FIG. 9 illustrates an embodiment of a microfluidic device for production of a microparticle.

The fabrication of microparticles can be achieved by use of microfluidic technology in which a microemulsion system is implemented. The microfluidic device can be fabricated from, for example, silicon, glass, PDMS, thermoplastic polymers such as COC, PMMA, PC, PS or thermoplastic elastomer using photolithography, wet or dry etching, soft-lithography, hot-embossing, nanoimprinting, injection-molding etc. An example of a microfluidic system (200) is shown in FIG. 9. The microfluidic device (200) consists of three flow-focusing junctions that are used to generate microdroplets in microfluidic channels (explained in greater detail in FIG. 10). The dimensions of the device can be 2 cm by 5 cm, although other dimensions are possible.

By flowing aqueous solution as a dispersed phase and oil solution as a continuous phase, water-in-oil emulsions can be obtained. Similarly, by flowing oil solutions as a dispersed phase and aqueous solutions as a continuous phase, oil-in-water emulsions can be obtained. Therefore, by connecting three junctions in parallel and alternating aqueous solutions (monomers) and oil solutions, a triple emulsion is generated. By changing the flow velocity of continuous and dispersed phases and the size of a given junction, various droplet sizes can be obtained (for example, from 1 to 1000 μm).

Figure 10:
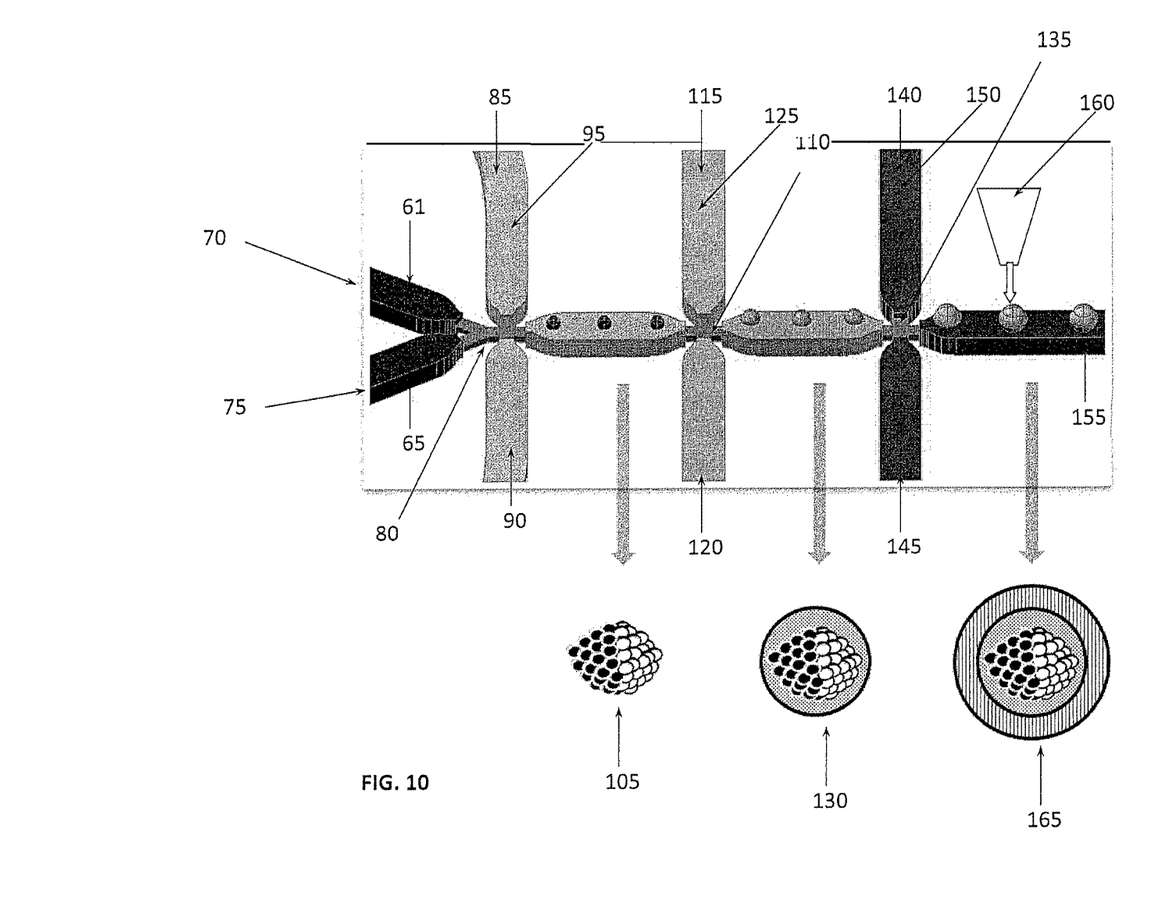
FIG. 10 illustrates a method to produce microparticles of either the first or second embodiment.

The microfluidic device utilizes a flow focusing method to create triple emulsion droplets, as illustrated in FIG. 10. For generation of Janus droplets of the first embodiment, monomer A (61) and monomer B (65) compositions are injected in the first two inlets (70, 75) respectively and co-flow to a junction (80). As an example, monomer A can contain magnetic-gold nanoparticles while monomer B can contain fluorescent nanoparticles. The junction is intercepted perpendicularly by two channels (85, 90) that carry the non-evaporating liquid (95) (ionic liquid, oil or resin) which enables the creation of Janus droplets (105) through flow-focusing. The non-evaporating liquid (95) then carries the generated Janus droplets (105) to a second junction (110) which is intercepted by two channels (115, 120) flowing monomer C (125).

Alternatively, in the case of Janus particles of the second embodiment, fabricated using electroless Nickel deposition or self-assembled solvent evaporated magnetic nanoparticles (see, for example, FIGS. 11A and 11B), the particles are directly dispersed in the non-evaporating liquid (95) and injected into the second junction (110) illustrated in the FIG. 10, thereby bypassing the first junction (80). After junction (110), a double emulsion (130) composed of Janus droplet encapsulated in the non-evaporating liquid surrounded by monomer C continuous phase is created Finally, monomer C is flowed through a third junction (135) and intercepted by two channels (140, 145) carrying the continuous oil (or aqueous) phase (150). The resulting triple-emulsion (155) is generated composed of a Janus droplet immersed in the non-evaporating liquid that is encapsulated in the monomer C surrounded by continuous oil phase. A UV point source (160) near the third junction is then used to expose and polymerize monomers A, B and C, resulting in a smart microparticle (165).

Figure 11A:
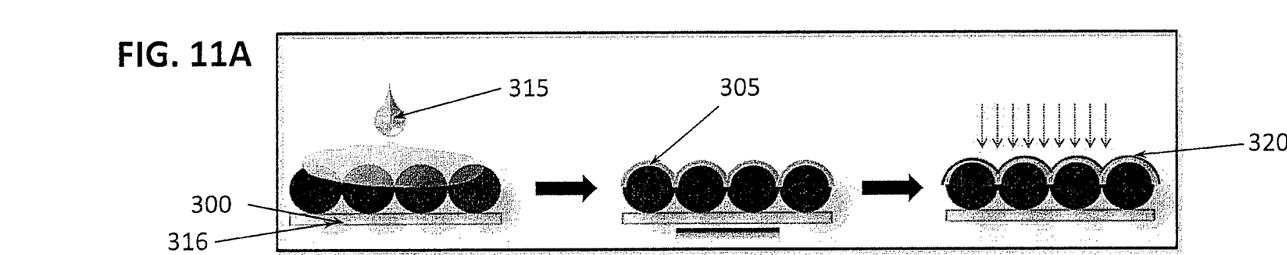
FIGS. 11A and 11B illustrate methods to produce Janus microparticles used in the second embodiment.
Figure 11B:
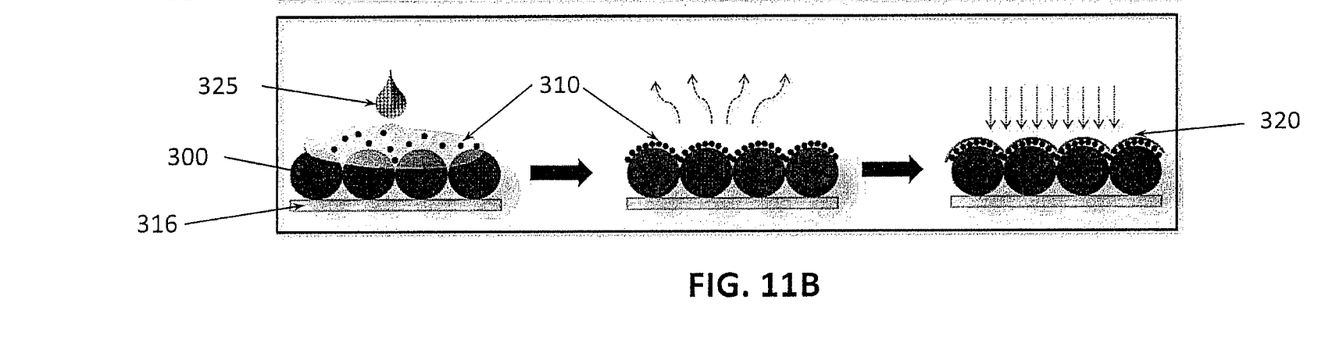

Alternatively, as illustrated in FIGS. 11A and 11B, the Janus microparticle can be fabricated starting with a homogeneous microparticle core (300), followed by deposition of a thin film (305) (as in FIG. 11A) or deposition of an assembly of nanoparticles (310) over one hemisphere of the microparticle core (300) (as in FIG. 11B).

The microparticle core (300) can be composed of a polymer loaded with fluorescent dye, nanoparticles or colorant or any combination thereof. An example of suitable polymers includes PEGDA, ETPTA, polystyrene, PMMA and others known in the art.

In FIG. 11A, a solution (315) of polymer microparticles dispersed in aqueous solution or solvent is deposited on a substrate (316) and solvent is evaporated. Upon solvent evaporation, microparticle cores create a densely packed monolayer of particles. The thin film (305) is subsequently deposited over the monolayer of microparticle cores. As illustrated in FIG. 11A, electroless Nickel solution is added drop-wise to the substrate containing a monolayer of microparticle cores (300). The substrate resides on a hot plate which initiates electroless Nickel deposition (305) on the surface of the microparticle cores (300). Following electroless Ni deposition, the deposited Nickel is further coated with an absorbing coating (320). The absorbing thin film (320) can be a combination of dielectric and metallic thin films such as gold, chromium, nickel, titanium, silicon dioxide and silicon nitride.

In an embodiment, the absorbing thin film (320) can consist of chromium, gold, nickel, chromium, silicon dioxide, chromium and silicon dioxide. For example, the absorbing coating can consist of Au (80 nm)—Cr (2 nm)—SiO$_2$ (80 nm)—Cr (10 nm)—SiO$_2$ (80 nm) deposited using sputtering or evaporation.

As illustrated in FIG. 11B, superparamagnetic functionality can be imparted to the Janus microparticle by deposition of superparamagnetic nanoparticles (310) on one hemisphere of the polymer microparticle core (300). The superparamagnetic nanoparticles (310) can consist of iron-oxide nanoparticles, silica-coated iron-oxide nanoparticles or gold-silica iron-oxide nanoparticles. As illustrated in FIG. 11B, a solution (325) containing superparamagnetic nanoparticles (310) is added dropwise to the substrate (316) containing a monolayer of microparticle cores (300). Following evaporation of nanoparticle solution, a monolayer of superparamagnetic nanoparticles (310) is formed on one hemisphere of the microparticle cores (300). Subsequently, thin absorbing film (320) is deposited to ensure that nanoparticles (310) are embedded in the newly formed Janus particle. The absorbing thin film (320) can be a combination of dielectric and metallic thin films such as gold, chromium, nickel, titanium, silicon dioxide and silicon nitride.

In an embodiment, the absorbing thin film (320) can consist of chromium, gold, nickel, chromium, silicon dioxide, chromium and silicon dioxide. For example, the absorbing coating can consist of Au (80 nm)—Cr (2 nm)—SiO$_2$ (80 nm)—Cr (10 nm)—SiO$_2$ (80 nm) deposited using sputtering or evaporation.

It will be appreciated by persons skilled in the art that the foregoing disclosure constitutes a description of specific embodiments of the microparticles, an ink comprising the microparticles, as well as, an apparatus and methods for producing the microparticles. These embodiments are only exemplary and are not meant to limit the disclosure to what has been particularly shown and described herein above. A variety of modifications and variations are possible in light of the above teachings without departing from the scope of the present disclosure. The ink comprising the microparticles, as well as, an apparatus and methods for producing the microparticles are further described and defined in the claims which now follow.

The invention claimed is:

1. A microparticle comprising: a) an exterior shell; b) a liquid encapsulated within the shell; and c) a Janus microparticle suspended in the liquid, wherein the Janus microparticle either comprises:
   a. two or more distinct assemblies of particles; or
   b. a core loaded with particles, the core having a first surface portion and a second surface portion that is functionally distinct from the first surface portion.

2. The microparticle of claim 1, wherein the Janus particle comprises two distinct assemblies of particles; each assembly of particles is embedded in a polymer; and the particles are selected from the group consisting of dyes, pigments, functional nanoparticles and any combination thereof.

3. The microparticle of claim 2, wherein a first assembly comprises a polymerized first monomer loaded with fluorescent silica nanoparticles and a second assembly comprises a polymerized second monomer loaded with plasmonic magnetic nanoparticles, the second monomer miscible or immiscible with the first monomer.

4. The microparticle of claim 2, wherein the plasmonic magnetic nanoparticles are gold-silica coated iron oxide nanoparticles.

5. The microparticle of claim 1, wherein the Janus particle comprises a core, the core is either a homogenous polymer or inorganic, and the core is loaded with particles selected from the group consisting of dyes, pigments, functional nanoparticles and any combination thereof.

6. The microparticle of claim 5, wherein at least one of the first and second surface portions are coated with either: a) a thin film; or b) a monolayer of nanoparticles that is subsequently covered with a thin optical film.

7. The microparticle of claim 6, wherein the thin film or the nanoparticles are magnetic.

8. The microparticle of claim 1 comprising an exterior polymeric or inorganic shell.

9. The microparticle of claim 6, wherein the exterior shell comprises silica.

10. The microparticle of claim 1, wherein the liquid is selected from an aqueous solution, oil, lubricant, ionic liquid and a resin.

11. The microparticle of claim 1, wherein the liquid has volatility of less than 23 torr at room temperature.

12. The microparticle of claim 1, wherein the Janus particle orients in response to an applied external field.

13. A microfluidic device for fabrication of the microparticle of claim 1 comprising: a first microfluidic channel that simultaneously intersects a second and third microfluidic channel at a first flow-focus junction leading to a fourth microfluidic channel; and the fourth microfluidic channel simultaneously intersects a fifth and sixth microfluidic channel at a second flow-focus junction leading to a seventh microfluidic channel, wherein the first flow-focus junction has a height and width that is less than a height and width of the fourth microfluidic channel.

14. The microfluidic device of claim 13, wherein the second flow-focus junction has a height and width that is less than a height and width of the seventh microfluidic channel.

15. The microfluidic device of claim 13, wherein each flow-focus junction has an aspect ratio of between 0.5 and 2.

16. The microfluidic device of claim 13, further comprising a UV source applied after the seventh microfluidic channel.

17. The microfluidic device of claim 13, wherein a dispersion of the Janus microparticle in the liquid flows in the first microfluidic channel; a continuous phase of a monomer flows in the second and third microfluidic channels; a double emulsion of droplets flows in the fourth microfluidic channel; a second liquid immiscible with the liquid flows in the fifth and sixth microfluidic channels; and a triple emulsion flows in the seventh microfluidic channel, wherein the double emulsion comprises droplets of the Janus microparticle in the liquid surrounded by the continuous phase of the monomer; and the triple emulsion comprises the Janus particle immersed in the liquid encapsulated by the monomer surround by a continuous phase of the second liquid.

18. The microfluidic device of claim 13, further comprising a prejunction prior to the first microfluidic channel, the prejunction consisting of the intersection of a plurality of additional microfluidic channels.

19. A plurality of the microparticles of claim 1 dispersed in an ink composition.

20. A method of fabricating the microparticle of claim 1 using a flow focusing microfluidic system, comprising the steps of:
  i) dispersing the Janus microparticle into the liquid in a first microfluidic channel of the microfluidic system to form a dispersion;
  ii) injecting the dispersion into a first junction intercepted by two monomer microfluidic channels, each monomer microfluidic channel carrying a continuous phase of a monomer towards the first junction, thereby forming a double emulsion composed of droplets surrounded by the continuous phase of the monomer, each droplet consisting of the Janus microparticle encapsulated by the liquid;
  iii) flowing the double emulsion through a second junction intercepted by two liquid microfluidic channels, each liquid microfluidic channel carrying a continuous phase of a second liquid, the second liquid immiscible with the liquid, thereby forming a triple emulsion composed of the Janus particle immersed in the liquid encapsulated by the monomer surround by a continuous phase of the second liquid; and
  iv) applying a UV source to the triple emulsion thereby polymerizing the monomer to form the external shell.

\* \* \* \* \*